(12) United States Patent
Noguchi (10) Patent No.: US 8,554,030 B2
(45) Date of Patent: Oct. 8, 2013

(54) OPTICALLY COUPLED DEVICE AND OPTICAL MODULE INCLUDING OPTICALLY COUPLED DEVICE

(75) Inventor: Koji Noguchi, Kawaguchi (JP)

(73) Assignee: Enplas Corporation, Saitama (JP)

( * ) Notice: Subject to any disclaimer, the term of this patent is extended or adjusted under 35 U.S.C. 154(b) by 824 days.

(21) Appl. No.: 12/316,211

(22) Filed: Dec. 10, 2008

(65) Prior Publication Data
US 2009/0154878 A1    Jun. 18, 2009

(30) Foreign Application Priority Data
Dec. 14, 2007  (JP) .................. 2007-323173

(51) Int. Cl.
*G02B 6/12* (2006.01)
*G02B 6/32* (2006.01)
*G02B 6/36* (2006.01)

(52) U.S. Cl.
USPC ............ 385/33; 385/14; 385/88; 385/93

(58) Field of Classification Search
USPC .......... 385/14, 31, 33, 34, 35, 36, 88, 89, 385/92, 93
See application file for complete search history.

(56) References Cited

U.S. PATENT DOCUMENTS

| | | | | |
|---|---|---|---|---|
| 6,328,484 | B1 * | 12/2001 | Uebbing | 385/93 |
| 7,108,432 | B2 * | 9/2006 | Nagasaka | 385/89 |
| 7,369,328 | B2 * | 5/2008 | Yamamoto et al. | 359/726 |
| 7,399,125 | B1 * | 7/2008 | Whaley et al. | 385/92 |
| 7,441,965 | B2 * | 10/2008 | Furuno et al. | 385/93 |
| 7,539,367 | B2 * | 5/2009 | Tamura et al. | 385/14 |
| 7,565,047 | B2 * | 7/2009 | Nishizawa et al. | 385/33 |
| 7,630,593 | B2 * | 12/2009 | Furuno et al. | 385/14 |

FOREIGN PATENT DOCUMENTS

JP   2005-031556   2/2005

* cited by examiner

*Primary Examiner* — Uyen Chau N Le
*Assistant Examiner* — John M Bedtelyon
(74) *Attorney, Agent, or Firm* — DLA Piper LLP (US)

(57) ABSTRACT

An optically coupled device and an optical module including the optically coupled device are provided that can appropriately and efficiently perform position measurement of an optical surface, and allow a product having superior overall efficiency to be stably manufactured at a low cost.
An optically coupled device main body 15 is formed having a shape that allows both first lens surface 5 and second lens surface 8 to be viewed simultaneously from a surface normal direction of at least one of a first surface portion 2*a* and a second surface portion 3*a*.

10 Claims, 10 Drawing Sheets

[ Prior Art ]

Fig.9

[ Prior Art ]

Fig.10

[ Prior Art ]

[ Prior Art ]

(b)

[ Prior Art ]

Fig.15 ic conversion elements of the photoelectric conversion device and each end surface of the plurality of optical fibers.

OPTICALLY COUPLED DEVICE AND OPTICAL MODULE INCLUDING OPTICALLY COUPLED DEVICE

BACKGROUND OF THE INVENTION

1. Field of the Invention

The present invention relates to an optically coupled device and an optical module including the optically coupled device. In particular, the present invention relates to an optically coupled device and an optical module including the optically coupled device suitable for optically coupling a photoelectric conversion device and a multi-mode optical fiber.

2. Description of the Related Art

In recent years, with increasing speed and capacity of data communication, the need is further rising for an optical fiber communication technology using an optical fiber.

An optical fiber communication technology such as this uses an optically coupled device to which an optical fiber and a photoelectric conversion device (such as a semiconductor laser or a photodetector) are attached. In many optically coupled devices, a surface facing a photoelectric conversion element (light-emitting unit or light-receiving unit) of the photoelectric conversion device and a surface facing an end surface of the optical fiber are formed into lens surfaces.

In this type of optically coupled device, for example, light emitted from a semiconductor laser is coupled to the end surface of the optical fiber using transmittance and refraction of light by the lens surfaces.

Among optically coupled devices, some include a lens array structure in which a plurality of lens surfaces are arranged to correspond to a plurality of optical fibers (multi-core optical fiber and the like)

Figure 8:
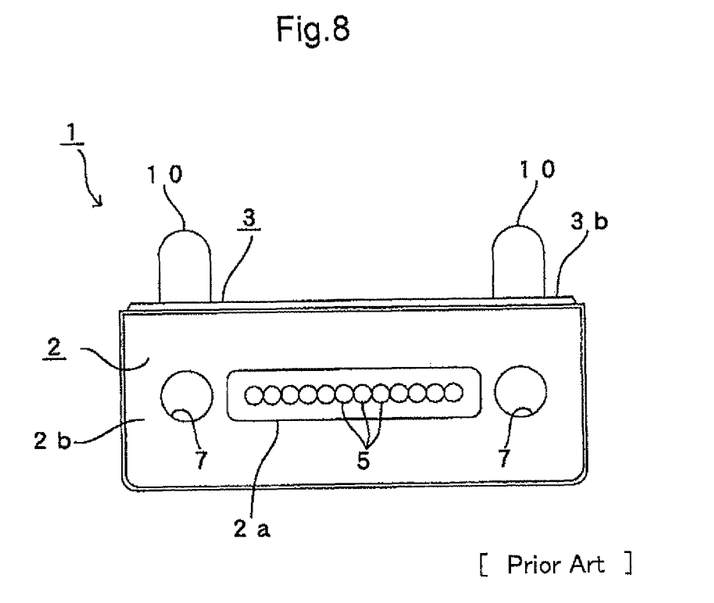
FIG. 8 is a front view of an example of a conventional optically coupled device.
Figure 9:
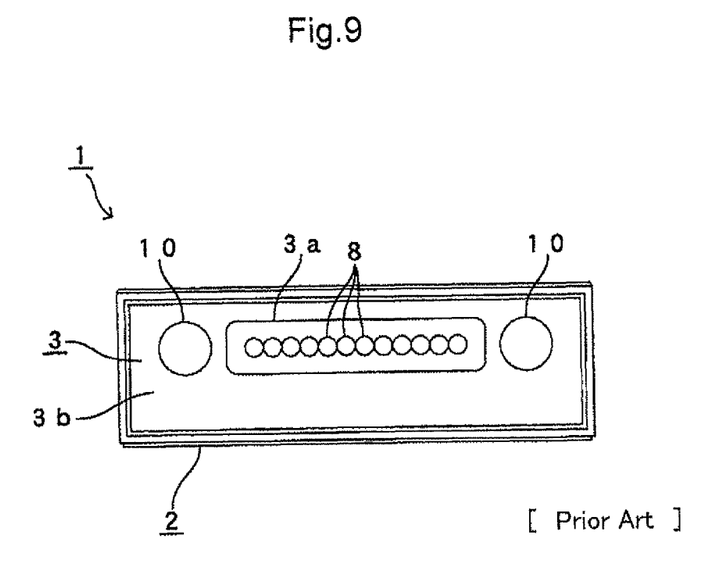
FIG. 9 is a planar view of FIG. 8.
Figure 10:
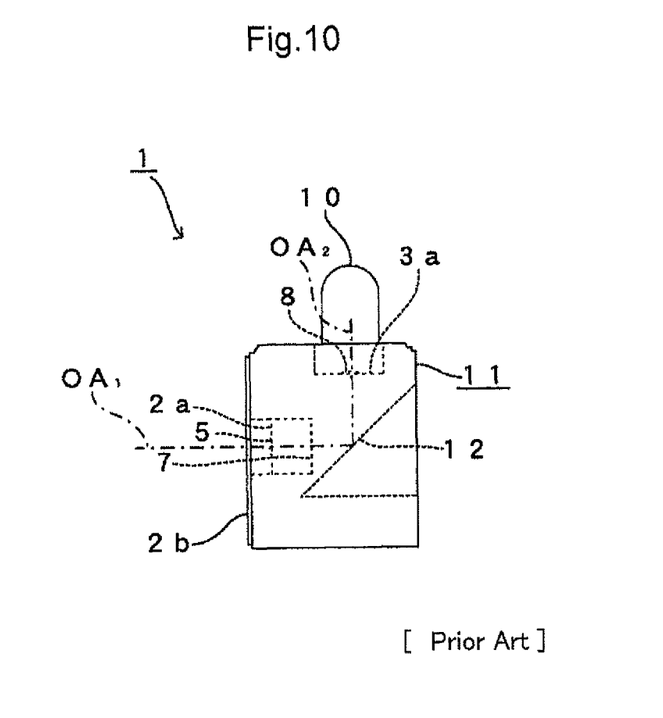
FIG. 10 is a right side view of FIG. 8.

FIG. 8 is a front view of an example of a conventional optically coupled device 1 having a lens array structure such as this. FIG. 9 is a planar view of FIG. 8. FIG. 10 is a right side view of FIG. 8.

In the optically coupled device 1 in FIG. 8, a photoelectric conversion device can be attached from the front to a front end surface (front end surface in FIG. 8) 2. A plurality of optical fibers can be attached from above to a front end surface 3. A plurality of photoelectric conversion elements that emit or receive light are formed in an array along a lateral direction in FIG. 8. The optical fibers are arrayed in the lateral direction in FIG. 8. A substrate-mounted photoelectric conversion device functioning as at least one of a vertical cavity surface emitting laser (VCSEL) and a photodetector, for example, is attached as the photoelectric conversion device. The plurality of optical fibers are housed within a connector and attached with the connector.

As shown in FIG. 8, on the front end surface 2 of the optically coupled device 1, a plurality of first lens surfaces 5 are formed on a surface portion 2a in an array, such as to be adjacent to one another along the lateral direction. The first lens surfaces 5 are convex towards the front (the front side in FIG. 8). The surface portion 2a is formed in a center portion and has a planar, roughly rectangular shape that is long in the lateral direction. The first lens surfaces 5 can form optical paths connecting each photoelectric conversion element of the photoelectric conversion device and each end surface of the optical fibers.

As shown in FIG. 8, on the front end surface 2 of the optically coupled device, an outer side surface portion 2b of the surface portion 2a on which the first lens surfaces 5 are formed is formed parallel to the surface portion 2a and higher towards the photoelectric conversion device side (front) in a surface normal direction of the surface portion 2a in relation to the surface portion 2a. When the photoelectric conversion device is attached to the optically coupled device 1, a semiconductor substrate of the photoelectric conversion device comes into contact with the outer side surface portion 2b.

Moreover, as shown in FIG. 8, a pair of circular positioning holes 7 is formed on positions near both outer sides of the surface portion 2a on which the first lens surfaces 5 are formed, in a direction in which the first lens surfaces 5 are arrayed. The positioning holes 7 are used for positioning the photoelectric conversion device when the photoelectric conversion device is attached to the optically coupled device 1. Specifically, when the photoelectric conversion device is attached, a pair of positioning pins (not shown) passing through the substrate of the photoelectric conversion device respectively engage with each positioning hole 7, thereby positioning the photoelectric conversion device.

On the other hand, as shown in FIG. 9, on a top end surface 3 of the optically coupled device 1, a plurality of second lens surfaces 8 are formed on a surface portion 3a in an array, such as to be adjacent to one another along the lateral direction. The second lens surfaces 8 are convex towards the front side in FIG. 9 (upward in FIG. 8). The surface portion 3a is formed in a center portion and has a planar, roughly rectangular shape that is long in the lateral direction. Each second lens surface 8 forms a pair with a first lens surface 5. With the first lens surfaces 5, the second lens surfaces 8 can form optical paths connecting each of the photoelectric conversion elements of the photoelectric conversion device and each end surface of the optical fibers. A distance between center points of the second lens surfaces 8 that are adjacent to each other is formed to match a distance between the center points of the first lens surfaces 5 that are adjacent to each other.

As shown in FIG. 9, on the upper end surface 3 of the optically coupled device, an outer side surface portion 3b of the surface portion 3a on which the second lens surfaces 8 are formed is formed parallel to the surface portion 3a and higher towards the optical fiber side (front side in FIG. 9 and upwards in FIG. 8) in a surface normal direction of the surface portion 3a in relation to the surface portion 3a. When the optical fibers are attached to the optically coupled device 1, the connector of the optical fibers comes into contact with the outer side surface portion 3b.

Moreover, as shown in FIG. 9, a pair of columnar positioning pins 10 is formed on positions near both outer sides of the surface portion 3a on which the second lens surfaces 8 are formed, in a direction in which the second lens surfaces 8 are arrayed. The positioning pins 10 are used for positioning the optical fibers when the optical fibers are attached to the optically coupled device 1. Specifically, when the optical fibers are attached, the positioning pins 10 engage with a pair of positioning holes (not shown) formed on the connector of the optical fibers, thereby positioning the optical fibers.

As shown in FIG. 10, a reflection surface 12 is formed on a rear end surface 11 of the optically coupled device 1 in a recessing manner. The reflection surface 12 is at an angle of about 45° to both an optical axis $OA_1$ of the first lens surfaces 5 and an optical axis $OA_2$ of the second lens surfaces 8. The reflection surface 12 can switch between an optical path of light traveling on the optical axis $OA_1$ of the first lens surfaces 5 and an optical path of light traveling on the optical axis $OA_2$ of the second lens surfaces 8, through reflection of the light. Therefore, the reflection surface 12, with the plurality of first lens surfaces 5 and the plurality of second lens surfaces 8, can form optical paths connecting each of the plurality of photoelectric conversion elements of the photoelectric conversion device and each end surface of the plurality of optical fibers.

In an optically coupled device 1 such as this, the optical fibers can be pulled out in parallel with the semiconductor substrate of the photoelectric conversion device. Therefore, the optically coupled device 1 has an advantage of requiring less physical space.

In an optically coupled device 1 such as this, to allow the first lens surfaces 5 and the second lens surfaces 8 to form a desired optical path, it is important that each lens surface 5 and 8 is formed with significant precision at a targeted position.

However, depending on manufacturing conditions, such as dimensional accuracy of a mold used to form the optically coupled device, positional accuracy of each lens surface 5 and 8 may not be sufficiently achieved, initially.

Therefore, conventionally, when the optically coupled device 1 is manufactured, at a product inspection stage, the position of each lens surface 5 and 8 in a product is measured. Based on measurement results, manufacturing conditions, such as adjustment of the mold, are adjusted accordingly, thereby ensuring the positional accuracy of the lens surfaces 5 and 8.

In a positional measurement of the lens surfaces, such as this, aiming to ensure the positioning accuracy of the lens surfaces, various measurement methods can be considered, such as a contact-type measurement method in which the lens surfaces are stroked by a probe, and a non-contact-type optical measurement method in using a tool microscope and an image measurement device. However, in terms of performing the positional measurement without damaging the lens surfaces that have small dimensions, the optical measurement method is preferred.

Figure 11:
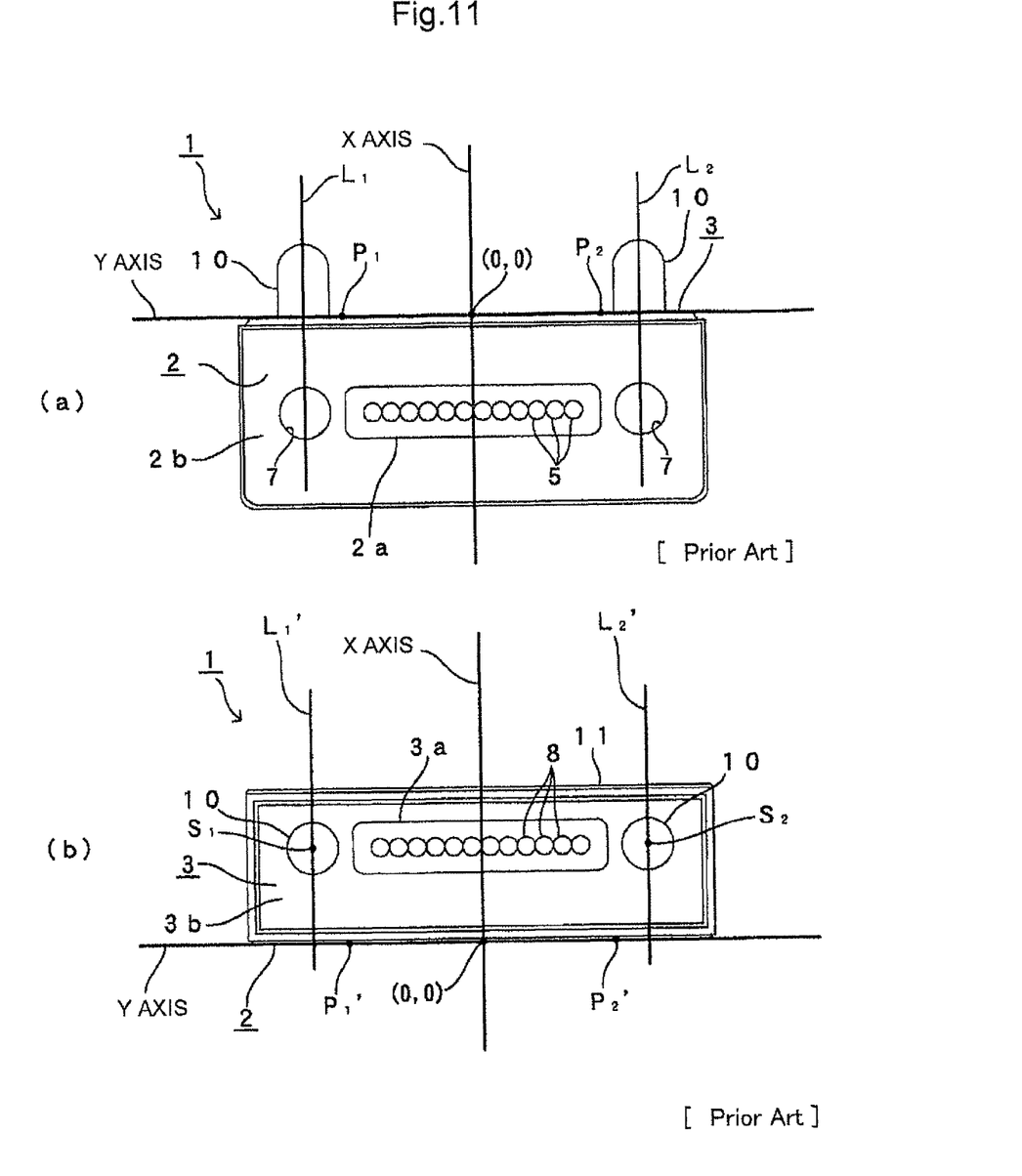
FIG. 11A is a diagram of a position measurement state of only first lens surfaces and an
XY coordinate system used when the position measurement is performed, in a conventional lens surface position measurement method.
FIG. 11B is a diagram of a position measurement state of only second lens surfaces and an XY coordinate system used when the position measurement is performed, in the conventional lens surface position measurement method

An example of an optical lens surface position measurement method is as follows. First, as shown in FIG. 11A, the optically coupled device 1 is set on the tool microscope in a state allowing the planar shape of the first lens surfaces 5 to be visible. At this time, the second lens surfaces 8 are not visible.

Then, after an outline of the upper end surface 3 extending in the lateral direction in FIG. 11A is recognized, two points, $P_1$ and $P_2$, that are separated from each other are taken on the outline. A line connecting the two points $P_1$ and $P_2$ is assumed. The line is defined as a Y axis of an XY coordinate system (two-dimensional Cartesian coordinate system).

Next, respective center lines $L_1$ and $L_2$ of the two positioning pins 10 are determined. A line at an equal distance from the two center lines $L_1$ and $L_2$ and parallel to both center lines $L_1$ and $L_2$ is determined. The line is defined as an X axis of the XY coordinate system.

Then, after an intersection between the X axis and the Y axis is determined to be a point of origin (0,0) in the XY coordinate system, the position measurement of the first lens surfaces 5 is performed by the X coordinate and the Y coordinate of a center point of each first lens surface 5 being determined.

Next, as shown in FIG. 11B, the optically coupled device 1 is set on the tool microscope in a state allowing the planar shape of the second lens surfaces 8 to be visible. At this time, the first lens surfaces 5 are not visible.

Then, after an outline of a portion (lower side edge in FIG. 11B) of the upper end surface 3 extending in the lateral direction in FIG. 11B is recognized, two points, $P_1'$ and $P_2'$, that are separated from each other are taken on the outline. A line connecting the two points $P_1'$ and $P_2'$ is assumed. The line is defined as a Y axis of an XY coordinate system.

Next, respective center points $S_1$ and $S_2$ of the two positioning pins 10 are determined. Center lines $L_1'$ and $L_2'$ passing through the two center points $S_1$ and $S_2$ and perpendicular to the Y axis are determined. A line at an equal distance from the two center lines $L_1'$ and $L_2'$ and parallel to both center lines $L_1'$ and $L_2'$ is determined. The line is defined as an X axis of the XY coordinate system.

Then, after an intersection between the X axis and the Y axis is determined to be a point of origin (0,0) in the XY coordinate system, the position measurement of the second lens surfaces 8 is performed by the X coordinate and the Y coordinate of a center point of each second lens surface 8 being determined.

In this way, conventionally, the position measurement of the lens surfaces 5 and 8 using the tool microscope is performed by an XY coordinate system being defined, with a predetermined area (such as the positioning pins 10) of the optically coupled device 1 as a reference.

Patent Literature 1: Japanese Patent Laid-open Publication No. 2005-31556

In the above-described optically coupled device 1, to allow an arbitrary first lens surface 5 and a corresponding second lens surface 8 to appropriately form an optical path, the Y coordinates of the center points of both lens surfaces 5 and 8 are required to match.

On the other hand, conventionally, during position measurement of the first lens surface 5, the XY coordinate system is defined based on a side surface shape of the positioning pins 10. During position measurement of the second lens surface 8, the XY coordinate system is defined based on a planar shape of the positioning pins 10. Therefore, even when the same positioning pins 10 serve as the reference for the XY coordinate system, depending on the dimensional accuracy of the positioning pins 10, high-precision position measurement of ht lens surfaces 5 and 8 is impeded.

In other words, when the positioning pins 10 are formed having an accurate columnar shape, the center lines $L_1$ and $L_2$ of the side surface shape of the positioning pins 10 shown in FIG. 11A passes through the center points $S_1$ and $S_2$ of the planar shape of the positioning pins 10 shown in FIG. 11B. In this case, shifting in the Y-axis direction does not occur between the center lines $L_1$ and $L_2$ in FIG. 11A and the lines $L_1'$ and $L_2'$ passing through the center points $S_1$ and $S_2$ in FIG. 11B. The Y coordinate of the point of origin in the XY coordinate system defined in FIG. 11A and the Y coordinate of the point of origin in the XY coordinate system defined in FIG. 11B match. In this case, when the Y coordinate of an arbitrary first lens surface 5 measured using the XY coordinate system defined in FIG. 11A matches the Y coordinate of the second lens surface 8 corresponding to the arbitrary first lens surface 5 measured using the XY coordinate system defined in FIG. 11B, the positions of both lens surfaces 5 and 8 can be judged to be appropriate.

However, when the positioning pins 10 are not formed having an accurate columnar shape, the center lines $L_1$ and $L_2$ in FIG. 11A do not pass through the center points $S_1$ and $S_2$ in FIG. 11B. In this case, misalignment in the Y-axis direction occurs between the center lines $L_1$ and $L_2$ in FIG. 11A and the lines $L_1'$ and $L_2'$ passing through the center points $S_1$ and $S_2$ in FIG. 11B. The Y coordinate of the point of origin in the XY coordinate system defined in FIG. 11A and the Y coordinate of the point of origin in the XY coordinate system defined in FIG. 11B do not match. In this case, when the positions of both lens surfaces 5 and 8 are judged to be appropriate because the Y coordinate of an arbitrary first lens surface 5 measured using the XY coordinate system defined in FIG. 11A matches the Y coordinate of the second lens surface 8 corresponding to the arbitrary first lens surface 5 measured using the XY coordinate system defined in FIG. 11B, an erroneous judgment is made.

Moreover, conventionally, the XY coordinate system used for the position measurement of the first lens surfaces 5 and the XY coordinate system used for the position measurement of the second lens surfaces 8 are required to be separately defined by a same procedure. Therefore, the position measurement of the lens surfaces cannot be efficiently performed.

In other words, conventionally, a problem occurs in that an appropriate and efficient position measurement of the lens surfaces is difficult to perform.

SUMMARY OF THE INVENTION

Therefore, the present invention has been achieved in light of the above-described issues. An object of the present invention is to provide an optically coupled device and an optical module including the optically coupled device that can appropriately and efficiently perform position measurement of an optical surface, and allow a product having superior overall efficiency to be stably manufactured at a low cost.

In order to achieve the aforementioned object, an optically coupled device according to a first aspect of the present invention is an optically coupled device to which a photoelectric conversion device and a multi-mode optical fiber can be attached. A photoelectric conversion element that emits or receives light is formed on the photoelectric conversion device. The optically coupled device can optically couple the photoelectric conversion element and an end surface of the optical fiber. The optically coupled device includes a first lens surface formed on a first surface portion of an end surface on the photoelectric conversion device side of an optically coupled device main body. The first surface portion faces the photoelectric conversion element when the photoelectric conversion device is attached. The first lens surface forms an optical path connecting the photoelectric conversion element and an end surface of the optical fiber. The optically coupled device also includes a second lens surface formed on a second surface portion of an end surface on the optical fiber side of an optically coupled device main body. The second surface portion faces the end surface of the optical fiber when the optical fiber is attached. The second lens surface forms an optical path connecting the photoelectric conversion element and the end surface of the optical fiber. In the optically coupled device, the optically coupled device main body is formed having a shape in which the end surface on the photoelectric conversion device side and the end surface on the optical fiber side are adjacent to each other, and the first surface portion and the second surface portion are perpendicular to each other. Moreover, the optically coupled device main body is formed having a shape allowing both the first lens surface and the second lens surface to be viewed simultaneously from a surface normal direction of at least one of the first surface portion and the second surface portion.

In the first aspect of the present invention, the optically coupled device main body is formed having a shape allowing both the first lens surface and the second lens surface to be viewed simultaneously from the surface normal direction of at least one of the first surface portion and the second surface portion. Therefore, when position measurement of one lens surface is performed, a two-dimensional coordinate system used for the position measurement of the lens surface can be directly used to measure a coordinate of a predetermined coordinate axis component of the other lens surface. Therefore, a relative positional relationship between one lens surface and the other lens surface can be accurately grasped at the same time using a common two-dimensional coordinate system. As a result, lens surface position measurement can be appropriately and efficiently performed.

An optically coupled device according to a second aspect is the optically coupled device according to the first aspect in which the optically coupled device is formed such that a device on which a plurality of photoelectric conversion elements are formed in an array can be attached as the photoelectric conversion device. The optically coupled device is formed such that a plurality of optical fibers can be attached to correspond to the plurality of photoelectric conversion elements. A plurality of first lens surfaces and a plurality of second lens surfaces are respectively formed in an array to correspond to the plurality of photoelectric conversion elements and the plurality of optical fibers. An array direction of the plurality of first lens surfaces and an array direction of the plurality of second lens surfaces are formed parallel to each other.

In the second aspect of the invention, a positional relationship of lens surface array directions of the plurality of first lens surfaces and the plurality of second lens surfaces respectively corresponding to the first lens surfaces can be grasped using the common two-dimensional coordinate system. Therefore, position measurement of the plurality of first lens surfaces and the plurality of second lens surfaces can be appropriately and efficiently performed.

An optically coupled device according to a third aspect is the optically coupled device according to the first aspect in which the end surface on the optical fiber side of the optically coupled device main body includes a third surface portion formed at a peripheral position of the second surface portion. The third surface portion is formed such as to be higher towards the optical fiber side in the surface normal direction of the second surface portion in relation to the second surface portion. The end surface on the optical fiber side of the optically coupled device main body also includes a fourth surface portion formed in a position adjacent to both the second surface portion and the end surface on the photoelectric conversion device side of the optically coupled device main body. The fourth surface portion is formed such as to have a same planar shape as the second surface portion or such as to be lower towards a side heading away from the optical fiber in the surface normal direction of the second surface portion in relation to the second surface portion. The optically coupled device is formed such that the fourth surface portion allows the second lens surface to be viewed simultaneously with the first lens surface from the surface normal direction of the first surface portion.

In the third aspect of the invention, the second lens surface can be viewed simultaneously with the first lens surface from the surface normal direction of the first surface portion through use of a simple shape. Therefore, cost is further reduced.

An optically coupled device according to a fourth aspect is the optically coupled device according to the third aspect in which at least one portion of the third surface portion is formed to allow contact with a connector of the optical fiber when the optical fiber is attached.

In the fourth aspect of the invention, the third surface portion allows a focal distance to be appropriately secured between the end surface of the optical fiber and the second lens surface, thereby maintaining favorable overall efficiency.

An optically coupled device according to a fifth aspect is the optically coupled device according to the first aspect in which the end surface on the photoelectric conversion device side of the optically coupled device main body includes a fifth surface portion formed at a peripheral position of the first surface portion. The fifth surface portion is formed such as to be higher towards the photoelectric conversion device side in the surface normal direction of the first surface portion in relation to the first surface portion. The end surface on the photoelectric conversion device side of the optically coupled device main body also includes a sixth surface portion formed in a position adjacent to both the first surface portion and the end surface on the optical fiber side of the optically coupled device main body. The sixth surface portion is formed such as to have a same planar shape as the first surface portion or such as to be lower towards a side heading away from the photoelectric conversion device in the surface normal direction of the first surface portion in relation to the first surface portion. The optically coupled device is formed such that the sixth surface portion allows the first lens surface to be viewed simultaneously with the second lens surface from the surface normal direction of the second surface portion.

In the fifth aspect of the present invention, the first lens surface can be viewed simultaneously with the second lens surface from the surface normal direction of the second surface portion through use of a simple shape. Therefore, cost is further reduced.

An optically coupled device according to a sixth aspect is the optically coupled device according to the fifth aspect in which at least one portion of the fifth surface portion is formed to allow contact with the photoelectric conversion device when the photoelectric conversion device is attached.

In the sixth aspect of the invention, the fifth surface portion allows a focal distance to be appropriately secured between the photoelectric conversion elements of the photoelectric conversion device and the first lens surface, thereby maintaining favorable overall efficiency.

An optical module according to a seventh aspect is an optical module including an optically coupled device according to the first aspect and a photoelectric conversion device corresponding to the optically coupled device. A photoelectric conversion element that emits or receives light is formed on the photoelectric conversion device.

In the seventh aspect of the invention, both the first lens surface and the second lens surface can be viewed simultaneously from the surface normal direction of at least one of the first surface portion and the second surface portion. Therefore, when position measurement of one lens surface is performed, a two-dimensional coordinate system used for the position measurement of the lens surface can be directly used to measure a coordinate of a predetermined coordinate axis component of the other lens surface. Therefore, a relative positional relationship between one lens surface and the other lens surface can be accurately grasped at the same time using a common two-dimensional coordinate system.

EFFECT OF THE INVENTION

The optically coupled device and the optical module of the present invention can appropriately and efficiently perform position measurement of an optical surface, and allow a product having superior overall efficiency to be stably manufactured at a low cost.

DETAILED DESCRIPTION OF THE PREFERRED EMBODIMENT (First Embodiment)

An optically coupled device and an optical module according to an embodiment of the present invention will be described below with reference to FIG. 1 to FIG. 7.

Figure 1:
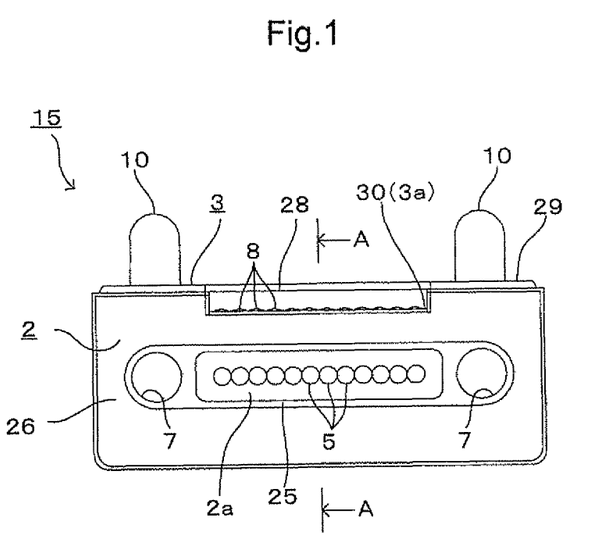
FIG. 1 is a front view of an optically coupled device according to an embodiment of the present invention.
Figure 2:
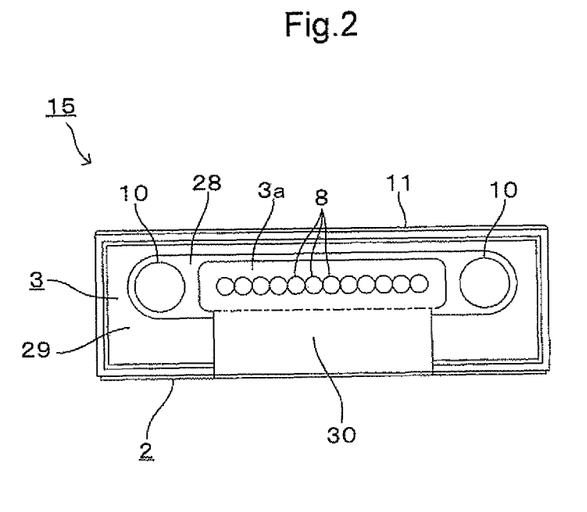
FIG. 2 is a planar view of FIG. 1.
Figure 3:
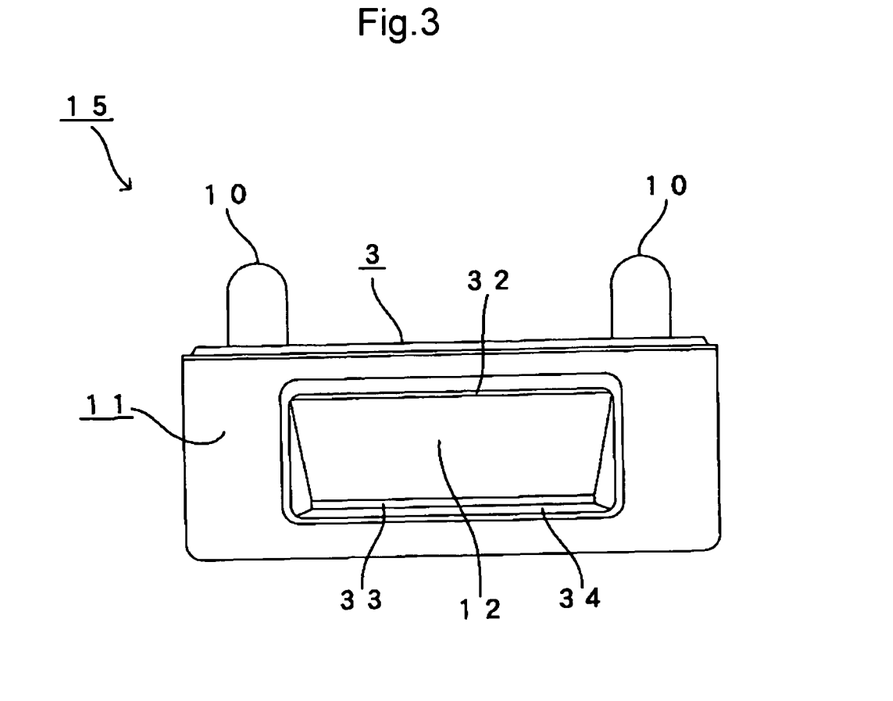
FIG. 3 is a rear view of FIG. 1.
Figure 4:
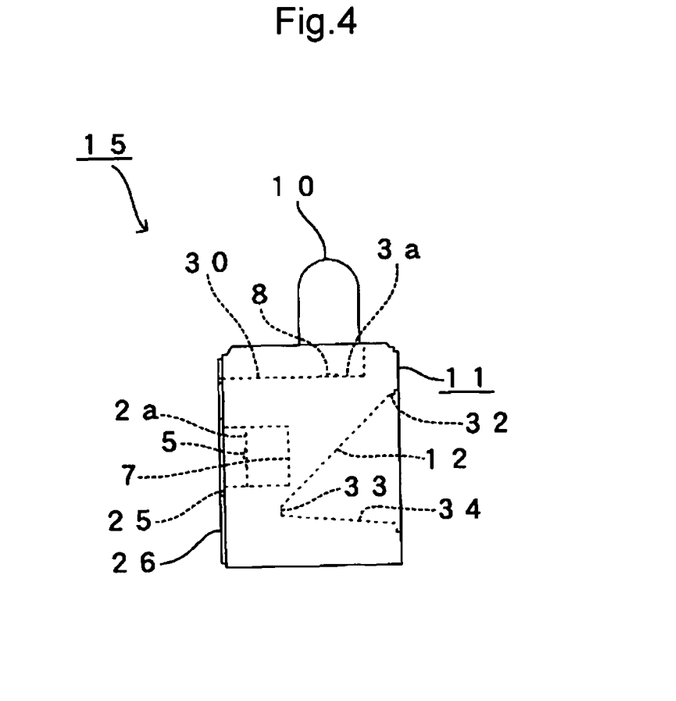
FIG. 4 is a right side view of FIG. 1.
Figure 5:
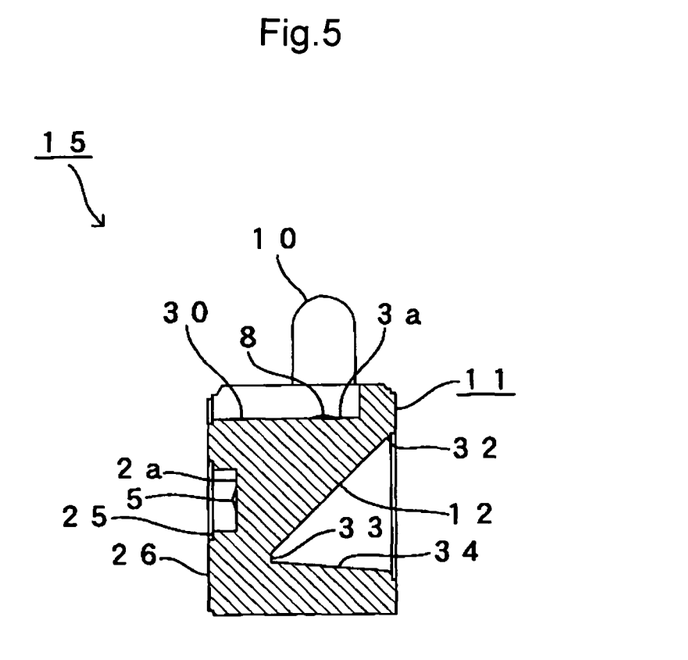
FIG. 5 is a cross-sectional view taken along line A-A in FIG. 1.
Figure 6:
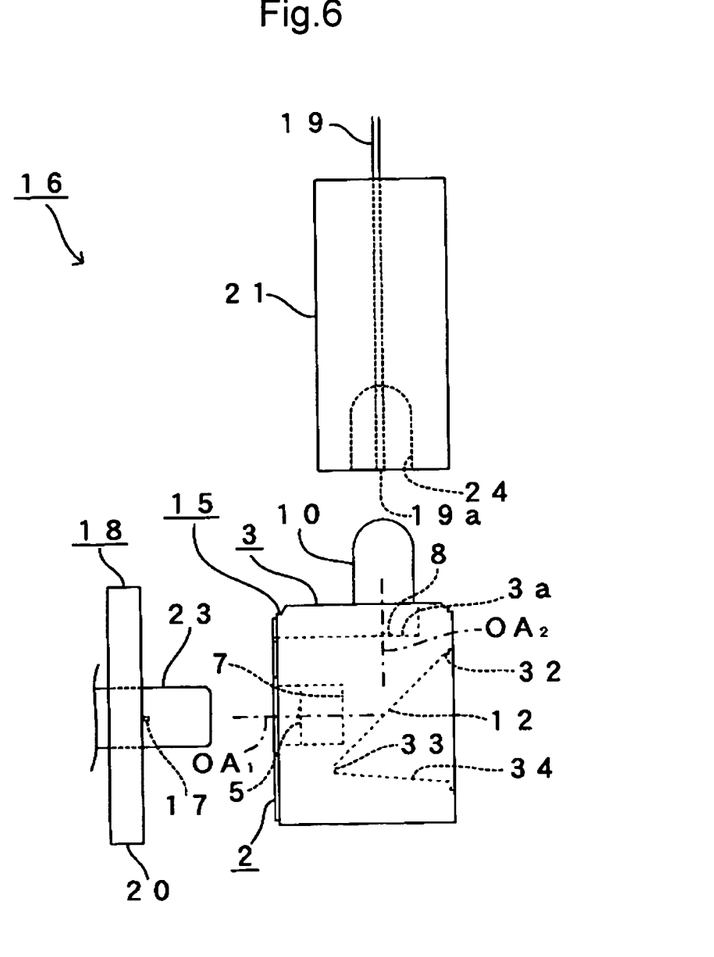
FIG. 6 is an exploded view of an optical module according to the embodiment of the present invention.
Figure 7:
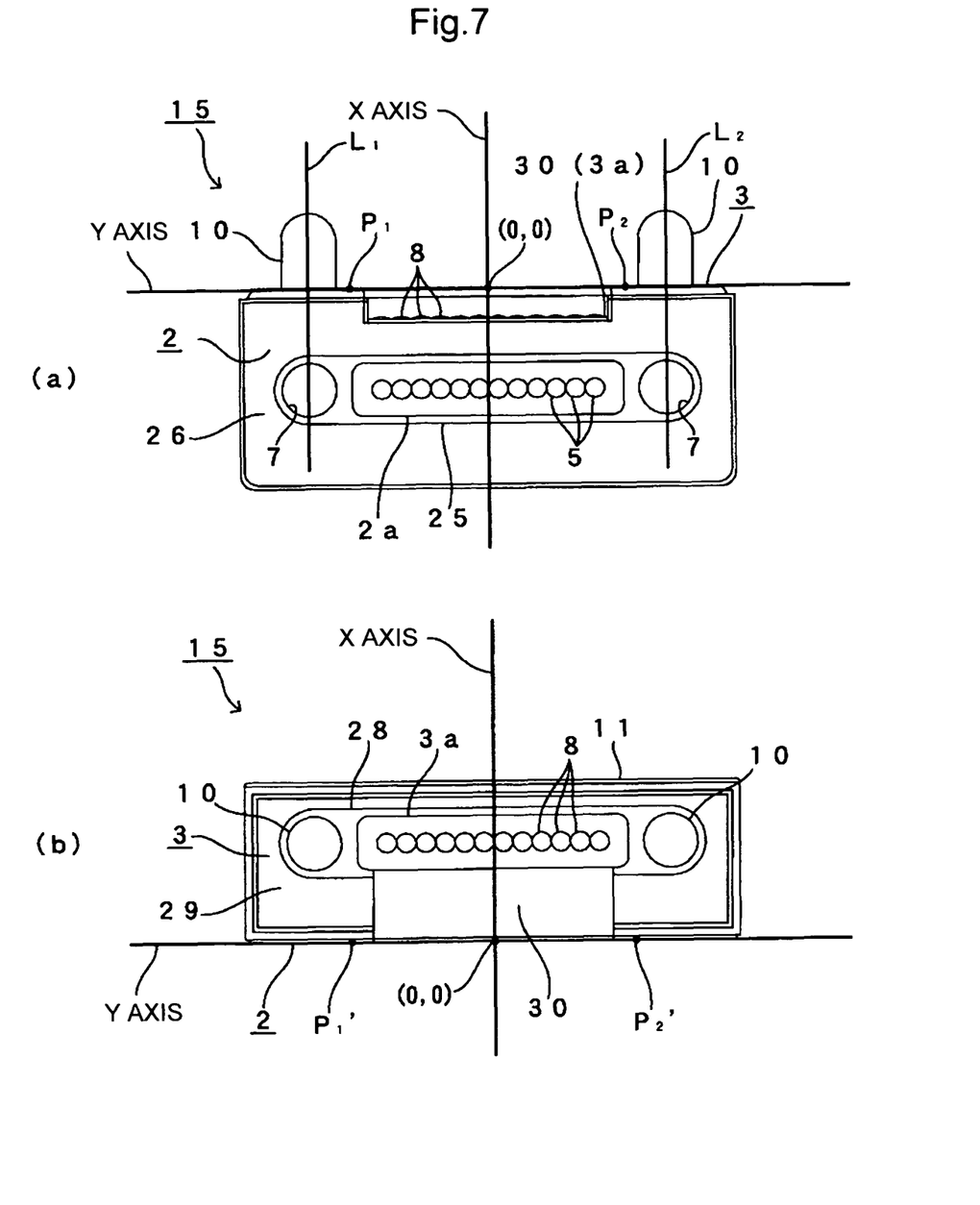
FIG. 7A is a diagram of a lens surface position measurement state allowing a relative positional relationship between first lens surfaces and second lens surfaces to be grasped, and an XY coordinate system used when the position measurement is performed, in the optically coupled device according to the embodiment of the present invention.
FIG. 7B is a diagram of a position measurement state of only the second lens surfaces and an XY coordinate system used when the position measurement is performed, in the optically coupled device according to the embodiment of the present invention.

FIG. 1 is a front view of an optically coupled device 15 according to the embodiment. FIG. 2 is a planar view of FIG. 1. FIG. 3 is a rear view of FIG. 1. FIG. 4 is a right-side view of FIG. 1. FIG. 5 is a cross-sectional view taken along line A-A in FIG. 1. FIG. 6 is an exploded right-side view of an optical module 16 according to the embodiment.

Like a conventional optically coupled device, the optically coupled device 15 according to the embodiment is formed in a manner allowing each of a plurality of photoelectric conversion elements formed in an array on a photoelectric conversion device and respective end surfaces of a plurality (for example, the same number as the photoelectric conversion elements) of multi-mode optical fibers corresponding to the photoelectric conversion elements to be optically coupled. The photoelectric conversion elements emit or receive light.

In other words, as shown in FIG. 6, the optically coupled device 15 according to the embodiment is formed such that a photoelectric conversion device 18 can be attached to a front end surface 2 (a left end surface in FIG. 6) that serves as a photoelectric conversion device-side end surface of the optically coupled device 15. A plurality of photoelectric conversion elements 17 are formed in an array on a semiconductor substrate 20 in the photoelectric conversion device 18. Because FIG. 6 is a diagram of the photoelectric conversion device 18 viewed from a direction in which the photoelectric conversion elements 17 are arrayed, only a single photoelectric conversion element 17 is shown. In actuality, a plurality of photoelectric conversion elements 17 are arrayed along a direction perpendicular to a surface of the paper on which FIG. 6 is printed. A photoelectric conversion device 18 such as this is attached to the optically coupled device 15 such that the photoelectric conversion elements 17 face the front end surface 2 side of the optically coupled device 15. When the photoelectric conversion device 18 is attached, the photoelectric conversion device 18 is positioned by a pair of positioning pins 23 passing through the semiconductor substrate 20 being respectively engaged with a pair of positioning holes 7 of the optically coupled device 15. The photoelectric conversion device 18 is then fixed by a fixing means, such as press-fitting, at the position at which the photoelectric conversion device 18 is positioned. In a photoelectric conversion device 18 such as this, when a light-emitting unit that emits light and a light-receiving unit that receives light are both disposed as the photoelectric conversion element 17, the present invention can be applied to bi-directional communication.

As shown in FIG. 6, a plurality of optical fibers 19 can be attached with a connector 21 to an upper end surface 3 adjacent to the front end surface 2. The upper end surface 3 serves as an optical fiber-side end surface of the optically coupled device 15. Because FIG. 6 is a diagram of the optical fibers 19 viewed from a direction in which the optical fibers 19 are arrayed, only a single optical fiber 19 is shown. In actuality, a plurality of optical fibers 19 are arrayed along a direction perpendicular to a surface of the paper on which FIG. 6 is printed. Optical fibers 19 such as these are attached to the optically coupled device 15 such that end surfaces 19a of the optical fibers 19 face the upper end surface 3 of the optically coupled device 15. When the optical fibers 19 are attached, the optical fibers 19 are positioned by a pair of positioning holes 24 formed on the connector 21 being respectively engaged with a pair of positioning pins 10 of the optically coupled device 15. The optical fibers 19 are then fixed by a fixing means, such as press-fitting, at the position at which the optical fibers 19 are positioned.

As shown in FIG. 1, FIG. 4, and FIG. 5, a roughly rectangular shaped area that is long in the lateral direction of FIG. 1, formed in a center portion of the front end surface 2 of the optically coupled device 15, is a first surface portion 2a. A plurality (for example, the same number as the photoelectric conversion elements 17) of first lens surfaces 5, similar to those in FIG. 8, are formed in an array along the lateral direction of FIG. 1. The first lens surfaces 5 serve as first lens surfaces. When the photoelectric conversion device 18 is attached to the optically coupled device 15, the first surface portion 2a and the first lens surfaces 5 face the plurality of photoelectric conversion elements 17 of the photoelectric conversion device 18. The first lens surfaces 5 can form optical paths connecting each photoelectric conversion element 17 of the photoelectric conversion device 18 and each end surface 19a of the optical fibers 19.

As shown in FIG. 1, FIG. 4, and FIG. 5, on the front end surface 2 of the optically coupled device 15, a surface portion 25 is formed on an outer position adjacent to the first surface portion 2a, such as to surround the overall periphery of the first surface portion 2a. The surface portion 25 is formed parallel to the first surface portion 2a and higher towards the photoelectric conversion device 18 side (front) in a surface normal direction of the first surface portion 2a in relation to the first surface portion 2a. A pair of positioning holes 7, similar to those in FIG. 8, are respectively formed near both ends in the lateral direction within the surface portion 25. The surface portion 25 serves as a surface portion 25 for burr clearance, preventing burrs formed within the first surface portion 2a (such as on an outer circumferential end of the surface portion 2a) from projecting further towards the photoelectric conversion device 18 side than a fifth surface portion 26, described hereafter.

The fifth surface portion 26 is formed in a peripheral position of the first surface portion 2a that is an outer position adjacent to the surface portion 25 for burr clearance. The fifth surface portion 26 is formed parallel to the surface portion 2a and the surface portion 25 for burr clearance and higher towards the photoelectric conversion device 18 side (front) in a surface normal direction of the first surface portion 2a in relation to the surface portion 2a and the surface portion 25 for burr clearance. When the photoelectric conversion device 18 is attached to the optically coupled device 15, the semiconductor substrate 20 of the photoelectric conversion device 18 comes into contact with the fifth surface portion 26. As a result of the semiconductor substrate 20 coming into contact with the fifth surface portion 26, a constant interval equivalent to a focal distance can be secured between the photoelectric conversion elements 17 and the first lens surfaces 5. The constant interval can be more appropriately secured as a result of the burrs being prevented from projecting from the fifth surface portion 26 beforehand by the surface portion 25 for burr clearance, even when the burrs are formed within the first surface portion 2a.

On the other hand, as shown in FIG. 2, FIG. 4, and FIG. 5, a roughly rectangular shaped area that is long in the lateral direction of FIG. 2, formed in a center portion of the upper end surface 3 of the optically coupled device 15, is a second surface portion 3a. A plurality (for example, the same number as the first lens surfaces 5) of second lens surfaces 8, similar to those in FIG. 9, are formed in an array along the lateral direction of FIG. 3. The second lens surfaces 8 serve as second lens surfaces. When the optical fibers 19 are attached to the optically coupled device 15, the second surface portion 3a and the second lens surfaces 8 face the end surfaces 19a of the optical fibers 19. The second lens surfaces 8 can form optical paths connecting each photoelectric conversion element 17 of the photoelectric conversion device 18 and each end surface 19a of the optical fibers 19.

As shown in FIG. 2, on the upper end surface 3 of the optically coupled device 15, a surface portion 28 is formed on an outer position adjacent to the second surface portion 3a, such as to partially surround the periphery of the second surface portion 3a (from mainly three directions, the back [above in FIG. 2], the left, and the right). The surface portion 28 is formed parallel to the second surface portion 3a and higher towards the optical fiber 19 side in a surface normal direction of the second surface portion 3a in relation to the second surface portion 3a. A pair of positioning pins 10, similar to those in FIG. 9, are formed near both ends in the lateral direction within the surface portion 28. The surface portion 28 serves as a surface portion 28 for burr clearance, preventing burrs formed within the second surface portion 3a (such as on an outer circumferential end of the surface portion 3a) and burrs formed on a base-end outer circumference of the positioning pins 10 from projecting further towards the optical fiber 19 side than a third surface portion 29, described hereafter.

The third surface portion 29 is formed in a peripheral position of the second surface portion 3a that is an outer position adjacent to the surface portion 28 for burr clearance. The third surface portion 29 is formed parallel to the second surface portion 3a and higher towards the optical fiber 19 side in a surface normal direction of the second surface portion 3a in relation to the second surface portion 3a, such as to surround the outer circumference of the surface portion 28. When the optical fibers 19 are attached to the optically coupled device 15, the connector 21 comes into contact with the third surface portion 29. As a result of the connector 21 coming into contact with the third surface portion 29, a constant interval equivalent to a focal distance can be secured between the end surfaces 19a of the optical fibers 19 and the second lens surfaces 8. The constant interval can be more appropriately secured as a result of the burrs being prevented from projecting from the third surface portion 29 beforehand by the surface portion 28 for burr clearance, even when the burrs are formed within the second surface portion 3a.

As shown in FIG. 1, FIG. 2, FIG. 4, and FIG. 5, the optically coupled device 15 of the embodiment has a fourth surface portion 30 at a position on the upper end surface 3 adjacent to both the second surface portion 3a on the upper end surface 3 and the fifth surface portion 26 of the front end surface 2. The fourth surface portion 30 is formed having a same planar shape as the second surface portion 3a.

As shown in FIG. 2, the fourth surface portion 30 is formed such that dimensions in the lateral direction in FIG. 2 is slightly smaller than the second surface portion 3a along the second surface portion 3a. The fourth surface portion 30 is formed to positions reaching further outward in the direction in which the plurality of second lens surfaces 8 are arrayed than a pair of second lens surfaces 8 positioned on both ends in the direction in which the second lens surfaces 8 are arrayed.

According to the embodiment, as a result of a fourth surface portion 30 such as this, as shown in FIG. 1, a side surface shape of the second lens surfaces 8 from the surface normal direction of the first surface portion 2a can be viewed simultaneously with a planar surface shape of the first lens surfaces 5.

As shown in FIG. 3 to FIG. 6, a reflection surface 12 is formed on a rear end surface 11 of the optically coupled device 15 in a recessing manner, similar to that in FIG. 10. The reflection surface 12 is at an angle of about 45° to both an optical axis $OA_1$ (see FIG. 6) of the first lens surfaces 5 and an optical axis $OA_2$ (see FIG. 6) of the second lens surfaces 8. The reflection surface 12, with the first lens surfaces 5 and the second lens surfaces 8, can form a plurality of optical paths connecting each of the plurality of photoelectric conversion elements 17 of the photoelectric conversion device 18 and each end surface 19a of the plurality of optical fibers 19.

An upper-side tilted surface 32 is formed connected to an upper end of the reflection surface 12 in FIG. 3 to FIG. 6. The upper-side tilted surface 32 is slightly tilted upwards from the surface normal direction of the rear end surface 11. An orthogonal surface 33 is formed connected to a lower end of the reflection surface 12 in FIG. 3 to FIG. 6. The orthogonal surface 33 is perpendicular to the surface normal direction of the rear end surface 11. Moreover, a lower-side tilted surface 34 is formed connected to a lower end of the orthogonal surface 33. The lower-side tilted surface 34 is slightly tilted downwards from the surface normal direction of the rear end surface 11.

When the tilting angle of the reflection surface 12 is measured during a product manufacturing process, for example, it is important that a measuring device such as a non-contact-type, three-dimensional measuring device irradiate a laser beam for measurement towards both upper and lower ends of the reflection surface 12 from the rear of the optically coupled device 15 (right in FIG. 4 to FIG. 6), appropriately recognize both upper and lower ends of the reflection surface 12 by receiving a reflection light of the light beam, and accurately grasp positions of both upper and lower ends. In this case, because attachment positions of a light-emitting unit and a light-receiving unit of the measuring device are misaligned in the vertical direction, when the reflection surface 12 is measured, the laser beam is forced to be irradiated and the reflection light is forced to be reflected at an angle to the surface normal direction of the rear end surface 11. However, when each tilted surface 32 and 34 are formed as shown in FIG. 3 to FIG. 6, both irradiation of the laser beam to both upper and lower ends of the reflection surface 12 and reception of the reflection light from both upper and lower ends can be appropriately performed. Moreover, at this time, a borderline between the reflection surface 12 and the upper-side tilted surface 32 and a borderline between the reflection surface 12 and the orthogonal surface 33 can each be recognized. Therefore, the positions of both upper and lower ends of the reflection surface 12 can be grasped with certainty. As a result, measurement of the tilting angle of the reflection surface 12 can be performed with high precision.

Next, operations according to the embodiment will be described.

When the position measurement of the first lens surfaces 5 and the second lens surfaces 8 is performed on the optically coupled device 15 according to the embodiment, first, as shown in FIG. 7A, the optically coupled device 15 is placed on the tool microscope such that the planar shape of the first lens surfaces 5 is visible.

At this time, according to the embodiment, because the fourth surface portion 30 is formed, the side surface shape of the second lens surfaces 8 can also be viewed with the planar shape of the first lens surfaces 5.

Then, in this state, after an outline of the upper end surface 3 extending in the lateral direction in FIG. 7A is recognized, two points, $P_1$ and $P_2$, that are separated from each other are taken on the outline. A line connecting the two points $P_1$ and $P_2$ is assumed. The line is defined as a Y axis of an XY coordinate system (two-dimensional Cartesian coordinate system)

Next, respective center lines $L_1$ and $L_2$ of the two positioning pins 10 are determined. A line at an equal distance from the two center lines $L_1$ and $L_2$ and parallel to both center lines $L_1$ and $L_2$ is determined. The line is defined as an X axis of the XY coordinate system.

Then, after an intersection between the X axis and the Y axis is determined to be a point of origin (0,0) in the XY coordinate system, the position measurement of the first lens surfaces 5 is performed by the X coordinate and the Y coordinate of a center point of each first lens surface 5 being determined.

Moreover, at this time, because the second lens surfaces 8 are visible, the XY coordinate system in FIG. 7A can be directly used to measure Y coordinates of center point of the second lens surfaces 8. Here, the Y coordinates of the center points of the second lens surfaces 8 are determined, for example, as follows. After a line that passes through a surface peak of the second lens surface 8 and is parallel to the X axis is determined, an intersection between the line and the Y axis is a Y coordinate.

As a result, relative positional relationship between the first lens surfaces 5 and the second lens surfaces 8 or, in other words, whether the Y coordinates of the center points of the first lens surfaces 5 and the Y coordinates of the center points of the second lens surfaces 8 match can be accurately grasped at the same time using a common XY coordinate system.

At this time, because the side surface shape of the second lens surfaces 8 are visible, X coordinates of surface peak points of the second lens surfaces 8 can be measured, and whether all surface peak points of the plurality of second lens surfaces 8 have a same height can be judged.

Next, as shown in FIG. 7B, the optically coupled device 15 is placed on the tool microscope such that the planar shape of the second lens surfaces 8 is visible. At this time, the first lens surfaces 5 are not visible.

Then, after an outline of a portion (lower side edge in FIG. 7B) of the upper end surface 3 extending in the lateral direction in FIG. 7B is recognized, two points, $P_1'$ and $P_2'$, that are separated from each other are taken on the outline. A line connecting the two points $P_1'$ and $P_2'$ is assumed. The line is defined as a Y axis of an XY coordinate system.

According to the embodiment, the X axis defined in FIG. 7A is used as is.

Then, as shown in FIG. 7B, after determining an intersection between the X axis and the Y axis to be a point of origin (0,0) in the XY coordinate system, the X coordinate of each center point of the second lens surfaces 8 is determined, thereby performing the position measurement of the second lens surfaces 8. At this time, the Y coordinates of the center points of the second lens surfaces 8 are already measured in the operation in FIG. 7A. Therefore, measurement is not necessary.

As described above, according to the embodiment, the fourth surface portion 30 having a simple shape allows the second lens surfaces 8 to be viewed from the surface normal direction of the first surface portion 2a, simultaneously with the first lens surfaces 5. Therefore, the relative positional relationship between the first lens surfaces 5 and the second lens surfaces 8 can be accurately grasped at the same time using a common XY coordinate system. As a result, the positional measurement of the lens surfaces can be appropriately and efficiently performed at a low cost.

The present invention is not limited to the above-described embodiment. Various modifications can be made as required.

For example, according to the above-described embodiment, the fourth surface portion 30 is formed having a same planar shape as the second surface portion 3a. However, the present invention is not limited thereto. For example, the fourth surface portion 30 can be formed to become lower towards a side heading away from the optical fibers 19 in the surface normal direction of the second surface portion 3a in relation to the second surface portion 3a. In this case as well, the second lens surfaces 8 can be viewed from the surface normal direction of the first surface portion 2a, simultaneously with the first lens surfaces 5. Therefore, similar effects as those according to the above-described embodiment can be achieved.

Figure 12:
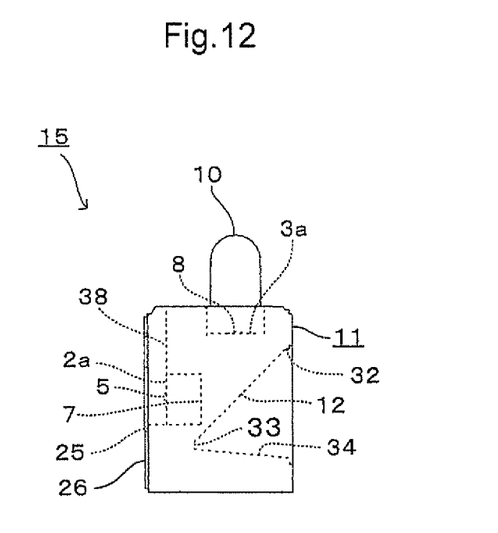
FIG. 12 is a right side elevational view of an optical module according to another embodiment of the present invention, corresponding to FIG. 4.
Figure 13:
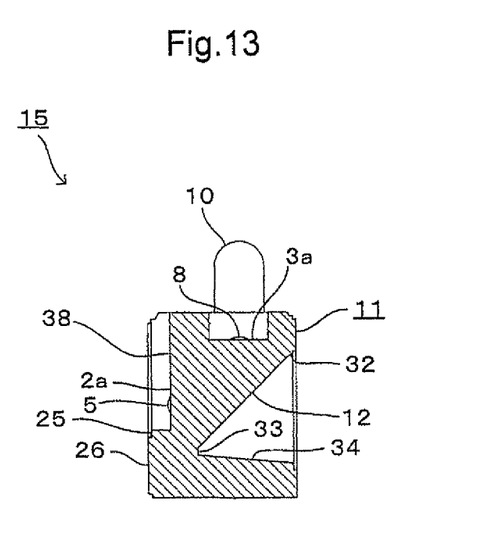
FIG. 13 is a cross-sectional view thereof, corresponding to FIG. 5.
Figure 14:
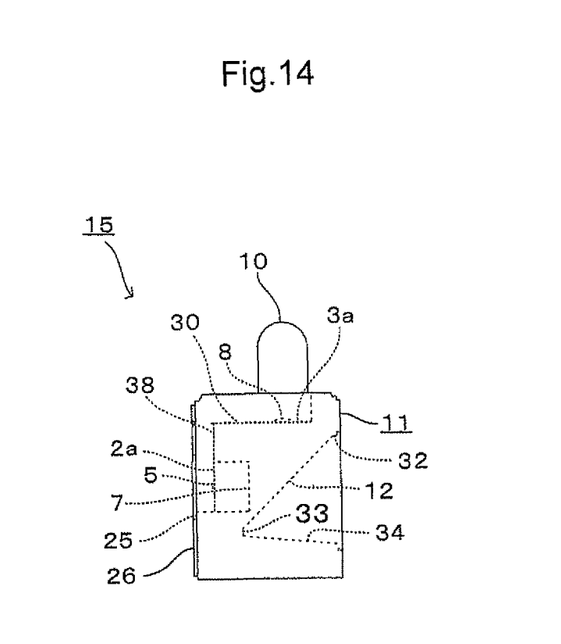
FIG. 14 is a right side elevational view of an optical module according to still another embodiment of the present invention, corresponding to FIGS. 4 and 12.
Figure 15:
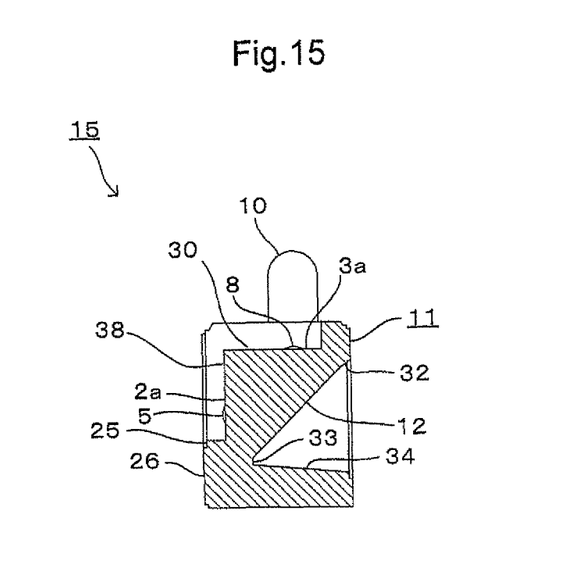
FIG. 15 is a cross-sectional view thereof, corresponding to FIGS. 5 and 13.

As shown in FIGS. 12 and 13, in place of the fourth surface portion 30 or, as shown in FIGS. 14 and 15, in addition to the fourth surface portion 30, a sixth surface portion 38 can be provided in a potion on the front end surface 2 adjacent to both the first surface portion 2a and the upper end surface 3 of the optically coupled device 15. The sixth surface portion 38 is formed so as to have a same planar shape as the first surface portion 2a or formed to be lower on a side heading away from the photoelectric conversion device 18 in the surface normal direction of the first surface portion 2a in relation to the first surface portion 2a.

In this structure, the sixth surface portion 38 allows the planar shape of the second lens surfaces 8 and the side surface shape of the first lens surfaces 5 to be simultaneously viewed from the surface normal direction of the second surface portion 3a. Therefore, the relative positional relationship between the first lens surfaces 5 and the planar shape of the second lens surfaces 8 is viewed. As a result, the positional measurement of the lens surfaces 5 and 8 can be appropriately and efficiently performed.

What is claimed is:

1. An optically coupled device to which a photoelectric conversion device, on which a photoelectric conversion element that emits or receives light is formed, and a multi-mode optical fiber can be attached, said optically coupled device optically coupling the photoelectric conversion element and an end surface of the optical fiber and comprising:

a first lens surface formed on a first surface portion of an end surface on a photoelectric conversion device side of an optically coupled device main body, the first surface portion facing the photoelectric conversion element when the photoelectric conversion device is attached thereto, and the first lens surface forming an optical path connecting the photoelectric conversion element and an end surface of the optical fiber;

a second lens surface formed on a second surface portion of an end surface on an optical fiber side of the optically coupled device main body, the second surface portion facing the end surface of the optical fiber when the optical fiber is attached thereto, and the second lens surface forming an optical path connecting the photoelectric conversion element and the end surface of the optical fiber; wherein, the optically coupled device main body is formed so as to have a shape in which
the end surface on the photoelectric conversion device side and the end surface on the optical fiber side are adjacent to each other, and
the first surface portion and the second surface portion are perpendicular to each other, the end surface on the optical fiber side of said optically coupled device main body is formed with:
a burr clearance surface portion which is on an optical fiber side of the optically coupled device main body and in which a positioning means formed on said optically coupled main body is coupled with a positioning means formed in a connector of said optical fiber,
a fourth surface portion formed in a position adjacent to both the second surface portion and the end surface on the photoelectric conversion device side of the optically coupled device main body so as to connect said second surface portion and said end surface on said photoelectric conversion device side, so that said fourth surface portion has a same planar shape as the second surface portion or is lower towards a side heading away from the optical fiber in a surface normal direction of the second surface portion in relation to the second surface portion,
a third surface portion formed, in a peripheral position of the second surface portion and in a position in which the fourth surface portion is not formed, so as to be higher than the second surface portion and the burr clearance surface portion on the optical fiber side and so as to be towards the optical fiber side in the surface normal direction of the second surface portion in relation to the second surface portion, said third surface portion being in physical contact with the connector of the optical fiber when the optical fiber is attached thereto, and said optically coupled device main body is formed such that the fourth surface portion allows the second lens surface to be viewed simultaneously with the first lens surface from the surface normal direction of the first surface portion.

2. The optically coupled device according to claim 1, wherein:
the optically coupled device is formed such that a device on which a plurality of photoelectric conversion elements are formed in an array can be attached thereto as the photoelectric conversion device;
the optically coupled device is formed such that a plurality of optical fibers can be attached thereto to correspond to the plurality of photoelectric conversion elements;
a plurality of first lens surfaces and a plurality of second lens surfaces are respectively formed on the optically coupled device in an array to correspond to the plurality of photoelectric conversion elements and the plurality of optical fibers;
an array direction of the plurality of first lens surfaces and an array direction of the plurality of second lens surfaces are formed parallel to each other, and
the fourth surface portion is formed in a width size reaching further outward in the direction in which the plurality of second lens surfaces are arrayed than a pair of second lens surfaces positioned on both ends in the direction in which the second lens surfaces are arrayed.

3. The optically coupled device according to claim 1, wherein:
the end surface on the photoelectric conversion device side of the optically coupled device main body includes
a burr clearance surface portion which is on the photoelectric conversion device side of the optically coupled device main body and in which a positioning means formed in said optically coupled device main body is coupled with a positioning means formed on the photoelectric conversion device,
a sixth surface portion formed in a position adjacent to both the first surface portion and the end surface on the optical fiber side of the optically coupled device main body so as to have a same planar shape as the first surface portion or so as to be to be lower towards a side heading away from the photoelectric conversion device in the surface normal direction of the first surface portion in relation to the first surface portion; and
a fifth surface portion formed, in a peripheral position of the first surface portion and in a position in which the sixth surface portion is not formed, so as to be higher than the first surface portion and the burr clearance surface portion on the photoelectric conversion device side and so as to be towards the photoelectric conversion device side in the surface normal direction of the first surface portion in relation to the first surface portion, said fifth surface portion being in physical contact with the photoelectric conversion device when the photoelectric conversion device is attached thereto, and
the optically coupled device is formed such that the sixth surface portion allows the first lens surface to be viewed simultaneously with the second lens surface from the surface normal direction of the second surface portion.

4. The optically coupled device according to claim 3, wherein the sixth surface portion is formed in a width size reaching further outward in the direction in which the plurality of first lens surfaces are arrayed than a pair of first lens surfaces positioned on both ends in the direction in which the first lens surfaces are arrayed.

5. An optical module comprising:
an optically coupled device according to claim 1 or 2; and
a photoelectric conversion device corresponding to the optically coupled device and on which a photoelectric conversion element that emits or receives light is formed.

6. An optical module comprising:
an optically coupled device according to claim 3; and
a photoelectric conversion device corresponding to the optically coupled device and on which a photoelectric conversion element that emits or receives light is formed.

7. An optical module comprising:
an optically coupled device according to claim 4; and
a photoelectric conversion device corresponding to the optically coupled device and on which a photoelectric conversion element that emits or receives light is formed.

8. An optically coupled device to which a photoelectric conversion device, on which a photoelectric conversion element that emits or receives light is formed, and a multi-mode optical fiber can be attached, said optically coupled device optically coupling the photoelectric conversion element and an end surface of the optical fiber and comprising:
a first lens surface formed on a first surface portion of an end surface on a photoelectric conversion device side of an optically coupled device main body, the first surface portion facing the photoelectric conversion element when the photoelectric conversion device is attached thereto, and the first lens surface forming an optical path connecting the photoelectric conversion element and an end surface of the optical fiber;
a second lens surface formed on a second surface portion of an end surface on an optical fiber side of the optically coupled device main body, the second surface portion facing the end surface of the optical fiber when the optical fiber is attached thereto, and the second lens surface forming an optical path connecting the photoelectric conversion element and the end surface of the optical fiber; wherein,
the optically coupled device main body is formed so as to have a shape in which
the end surface on the photoelectric conversion device side and the end surface on the optical fiber side are adjacent to each other, and
the first surface portion and the second surface portion are perpendicular to each other,
the end surface on the photoelectric conversion device side of the optically coupled device main body includes
a burr clearance surface portion which is on the photoelectric conversion device side of the optically coupled device main body and in which a positioning means formed in said optically coupled main body is coupled with a positioning means formed on the photoelectric conversion device,
a sixth surface portion formed in a position adjacent to both the first surface portion and the end surface on the optical fiber side of the optically coupled device main body so as to connect said first surface portion and said end surface on said optical fiber side, so that said sixth surface portion has a same planar shape as the first surface portion or is lower towards a side heading away from the photoelectric conversion device in a surface normal direction of the first surface portion in relation to the first surface portion; and
a fifth surface portion formed, in a peripheral position of the first surface portion and in a position in which the sixth surface portion is not formed, so as to be higher than the first surface portion and the burr clearance surface portion on the photoelectric conversion device side and so as to be towards the photoelectric conversion device side in the surface normal direction of the first surface portion in relation to the first surface portion, said fifth surface portion being in physical contact with the photoelectric conversion device when the photoelectric conversion device is attached thereto, and the optically coupled device is formed such that the sixth surface portion allows the first lens surface to be viewed simultaneously with the second lens surface from the surface normal direction of the second surface portion.

9. The optically coupled device according to claim 8, wherein:

the optically coupled device is formed such that a device on which a plurality of photoelectric conversion elements are formed in an array can be attached thereto as the photoelectric conversion device;

the optically coupled device is formed such that a plurality of optical fibers can be attached thereto to correspond to the plurality of photoelectric conversion elements;

a plurality of first lens surfaces and a plurality of second lens surfaces are respectively formed on the optically coupled device in an array to correspond to the plurality of photoelectric conversion elements and the plurality of optical fibers;

an array direction of the plurality of first lens surfaces and an array direction of the plurality of second lens surfaces are formed parallel to each other, and the sixth surface portion is formed in a width size reaching further outward in the direction in which the plurality of first lens surfaces are arrayed than a pair of first lens surfaces positioned on both ends in the direction in which the second lens surfaces are arrayed.

10. An optical module comprising:

an optically coupled device according to claim 8 or 9; and a photoelectric conversion device corresponding to the optically coupled device and on which a photoelectric conversion element that emits or receives light is formed.

* * * * *